Patented June 10, 1952

2,599,752

UNITED STATES PATENT OFFICE 2,599,752

DRILLING FLUIDS

Paul W. Fischer, Long Beach, Calif., assignor to Union Oil Company of California, Los Angeles, Calif., a corporation of California No Drawing. Application February 3, 1949,
Serial No. 74,496

5 Claims. (Cl. 252—8.5)

This invention relates to drilling fluids employed in the drilling of oil and gas wells, and in particular concerns drilling fluids of the oil-base type especially adapted for use in the presence of water.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling a fluid body, known as a drilling fluid or mud, is continuously circulated downwardly through the drill stem, through the bit and against the working face of the hole, and then upwardly toward the surface through the annular space between the drill stem and the wall of the bore hole. This drilling fluid serves a number of purposes, among which are cooling and lubricating the drill bit, suspending and removing cuttings from the hole, preventing the flow of liquids from the formations traversed by the bore into the same by applying hydrostatic pressure to such formations and fulfilling other requirements.

In instances where the underground formations are of such nature that they are not deleteriously affected by the presence of water it is customary to employ a drilling fluid of the water-base type, i. e., one consisting essentially of a continuous aqueous phase having suspended therein finely divided solids of such nature and in such amounts that the desired physical properties are attained in the fluid. In many locations, however, as for example in certain California fields, the underground formation traversed and/or penetrated by the well bore are at least in part composed of hydratable clays, such as bentonite or montmorillonite, which swell in the presence of water to form gel-like bodies of low load-bearing properties. Where formations of this nature occur along the length of the bore, the introduction of water into the bore may give rise to its eventual collapse brought about by the walls becoming hydrated to a weak gel. On the other hand, where the producing formation contains hydratable clays, the introduction of water into the bore causes such clays to swell, thereby greatly reducing the permeability of the formation and plugging up the pores and interstices through which the oil or gas flows into the well. In view of these difficulties it has become common practice to employ substantially non-aqueous oil-base drilling fluids in locations where the underground formations traversed and/or penetrated by the bore contain hydratable clays. Such oil-base fluids in general comprise an oil base, which is preferably of mineral origin, and minor proportions of agents adapted to control the physical properties of the oil.

While oil-base drilling fluids in themselves are highly satisfactory for use wherever hydratable clay formations are encountered in drilling, their effectiveness almost invariably decreases as the drilling proceeds by reason of their becoming contaminated with water introduced either from water-bearing underground formations which the bore traverses or at the surface as surface runoff, rain, etc. It is not uncommon for an oil-base drilling fluid which was substantially water-free at the start of a drilling operation to have acquired as much as 15 per cent or more of water after only a short period of operation. Removal of such contaminating water by physical or chemical means is in most cases difficult and expensive that the drilling fluid must be discarded.

It is an object of the present invention to provide a drilling fluid especially adapted for use in the presence of hydratable clays.

Another object is to provide an improved oil-base drilling fluid.

A further object is to provide an oil-base drilling fluid containing an agent having the property of nullifying or greatly reducing the adverse effect which any water with which the fluid may become contaminated will have on formations containing hydratable clays.

A still further object is to provide an oil-base drilling fluid containing a chemical agent capable of inhibiting the swelling of hydratable clays in the prsence of water.

Other objects will be apparent from the following detailed description of the invention, and various advantages not specifically referred to herein will be apparent to those skilled in the art upon employment of the invention in practice.

I have found that the above and related objects may be realized by incorporating into an oil-base drilling fluid a minor proportion of a water-soluble alkaline earth metal salt, e. g. calcium chloride. Such salts greatly inhibit the swelling of hydratable clays in the presence of water, and accordingly by including them in oil-base drilling fluids which are normally subjected to contamination with water, the adverse effect of such water on formations containing hydratable clays is nullified or at least greatly reduced. Such salts are incorporated in the drilling fluid in finely divided solid form and dissolve in any water which subsequently become introduced into the fluid either internally or externally of the well bore. The principle of the invention resides in the providing in an oil-base drilling fluid of an agent capable of counteracting the swelling effect of water upon hydratable clays, and is applicable to a wide variety of drilling fluid compositions ranging in complexity from simple oils to compositions comprising a variety of dispersing agents, weighting materials, fluid loss inhibitors, gel strength agents, viscosity regulators, etc., in addition to the oil base. The invention thus comprises in its broad form a drilling fluid essentially comprising a major proportion of an oil base having dispersed therein a minor proportion of a water-soluble alkaline earth metal salt.

While the water-soluble salts of any of the alkaline earth metals, i. e., magnesium, calcium, barium and strontium, may be employed in formulating the drilling fluids provided by the invention, those of calcium form a preferred group by reason of their low cost and efficiency in inhibiting the swelling of hydratable clays in the presence of water. Calcium chloride is particularly preferred. These salts may be employed either as the pure anhydrous salt or as a solid hydrate. It is usually desirable that the composition contain an emulsifying or dispersing agent adapted to promote suspension of the alkaline earth metal salt in the oil base. The proportion in which the alkaline earth metal salts are employed in the new drilling fluids depends upon a number of factors, the most important of which are related to the hydratable clay content of the formation in which the drilling fluid is employed, and the degree to which the fluid becomes contaminated with water during use. Thus, where the amount of water contamination is relatively small and the clay content of the formation being drilled is relatively low, only a small proportion, e. g. 1–4 per cent by weight based on the entire composition, of the alkaline earth metal salt need be employed. Alternatively, under more stringent conditions of water-contamination and clay occurrence a somewhat greater proportion, e. g. 4–10 percent by weight, of the salt should be employed.

The oil base employed in the new drilling fluids is preferably of mineral origin and may be crude petroleum or a distillate or residuum material. Distillates such as gas oil, kerosene, fuel oil, diesel fuel, lubricating oil, etc., have been found satisfactory as well as such heavier materials as light tars and asphalts, cracked residuum, heavy extracts and the like. Usually it is desirable to employ a mixed oil base comprising two or more oils blended to attain the desired physical properties. A highly satisfactory mixed base of this type comprises a major proportion, e. g., 60–90 per cent by weight of a relatively heavy oil, such as fuel oil, having a specific gravity of about 13–15° API and a viscosity of about 30–40 seconds SSF at 122° F., and a minor proportion, e. g. 10–40 per cent, of a light oil, such as diesel fuel, having a specific gravity of about 25–35° API and a viscosity of about 30–50 seconds SSU at 100° F. The invention, however, is not limited to the use of any particular types of oil or mixture thereof, and any of the oil bases known in the art may be satisfactorily employed.

While the drilling fluids provided by the invention in their simplest form comprise merely the oil base and the water-soluble alkaline earth metal salt, it is usually advantageous to include in the composition an agent adapted to promoting the uniform suspension of the finely divided solid salt in the oil. Such agent also serves to maintain other solid components, e. g., weighting agents and the like, suspended in the oils. A wide variety of materials capable of performing these functions is known in the art. For the most part they are oil-soluble water-insoluble soaps, as for example the calcium or other di- or polyvalent metal salts of organic fatty or sulfonic acids. Mahogany acid and resin acid soaps are likewise satisfactory, as are tall oil soaps. Often it is expedient to form such soaps within the drilling fluid itself by including in the fluid the soap acid, e. g., stearic acid, mahogany acids, rosin, tall oil, etc., and a base such as lime which will react with the soap acid to form the desired soap. The soap may also be formed in situ by a metathesis reaction between a soluble soap and a metal base. A highly satisfactory procedure of this type comprises dispersing a base such as lime in all or part of the oil base and thereafter adding an alkali-metal rosin soap. In such case the dispersing agent comprises a mixture of calcium rosin soap formed by reaction between the alkali-metal soap and the lime, and some unreacted alkali-metal rosin soap. The proportion in which the dispersing agent is provided in the composition depends upon the nature of the agent itself as well as upon the nature and quantity of material to be dispersed, but it is usually present in an amount representing from about 0.2–10 per cent by weight of the entire composition.

The new drilling fluids may likewise contain finely divided solid material to serve as a weighting agent to increase the overall density of the fluid. Such materials as barytes, whiting, iron oxides, calcined clay, lead dust, sand, fuller's earth, and the like are commonly employed for such purpose and usually comprise from about 2 to about 25 per cent by weight of the entire composition.

In addition to the above components, the drilling fluid may optionally comprise minor amounts of a variety of other agents adapted to modify or control various properties of the composition. Thus, it may contain a stabilizing agent, such as lamp black, starch, bentonitic clay, casein, agar-agar and the like, adapted to assist the dispersing agent in preventing the settling of solid components of the fluid as well as the drill cuttings. It may also contain a minor proportion, e. g., 0.1–5 per cent by weight, of a material such as asphalt or a hydratable clay adapted to form a coating on the walls of the bore hole and thereby prevent the loss of fluid into the formations traversed by the bore. It may also contain a material such as sodium silicate to improve the gel strength of the fluid. In general, the principle upon which the present invention is based is not limited to any specific combination of drilling fluid components, but is adaptable to any of the oil-base drilling fluids known in the art. The formulation of oil-base drilling fluids is well understood by those skilled in the art, and any of such fluids may advantageously comprise a water-soluble alkaline earth metal salt in accordance with the invention to inhibit the swelling action of water upon hydratable clays encountered during drilling.

The following examples will illustrate several ways in which the principle of the invention may be applied, but are not to be construed as limiting the same. All proportions are given in parts by weight.

Example I

|  | Parts | Per Cent by Weight |
|---|---|---|
| Light Domestic Diesel Fuel | 3,915 | 11.4 |
| Hydrated Lime | 210 | 0.6 |
| Light Domestic Fuel Oil | 26,410 | 77.4 |
| Sodium Rosin Soap | 2,100 | 6.1 |
| Water | 140 | 0.4 |
| Wyoming Bentonite | 210 | 0.6 |
| Finely-divided Calcium Chloride | 1,200 | 3.5 |
| Total | 34,185 | 100.0 |

The light domestic fuel oil is a petroleum distillate having an API gravity of 14.5°, a flash point of 170° F., and a viscosity of 36 SSF at 122° F. The diesel fuel is a petroleum distillate having a boiling range of about 400°–720° F., and an API gravity of about 31.0° and a viscosity of 40 SSU at 100° F. The composition is made up by suspending the finely divided lime in the diesel fuel, after which the suspension of the sodium rosin soap in the water is added with vigorous stirring. The bentonite is then stirred into the mixture, and the fuel oil is added slowly with thorough agitation. At this point sufficient 400-mesh whiting is added to bring the density of the composition up to 70.5 lbs./cu. ft. The calcium chloride is then stirred into the mixture. The resulting composition has the following characteristics:

| | |
|---|---|
| API fluid loss, 15 min | 0 |
| Viscosity at 115° F., marsh | 148 |
| Initial weight, lbs./cu. ft | 70.5 |
| 1-hr. weight, lbs./cu. ft | 69.5 |

In comparison, a sample of the fluid from which the calcium chloride had been omitted had a fluid loss value of 0, a viscosity of 145, an initial weight value of 70.5 and a 1-hr. weight value of 68, thus indicating that the presence of the calcium chloride does not materialy effect the physical properties of the fluid.

Example II

| | Per cent by weight |
|---|---|
| Gas oil distillate | 39.0 |
| Tall oil | 4.0 |
| Blown asphalt | 10.0 |
| Crushed oyster shells | 35.0 |
| Aqueous potassium hydroxide | 4.0 |
| Magnesium sulfate | 8.0 |
| | 100.0 |

Example III

| | Per cent by weight |
|---|---|
| Light fuel oil | 67.0 |
| Calcium mahogany sulfonate | 3.5 |
| Agar-agar | 0.5 |
| Hydrated lime | 1.0 |
| Barium sulfate, 300 mesh | 18.0 |
| Magnesium chloride | 10.0 |
| | 100.0 |

Example IV

| | Per cent by weight |
|---|---|
| Naphtha | 15.0 |
| Crude oil | 74.0 |
| Magnesium linseed oil soap | 2.0 |
| Sodium naphthenate | 2.0 |
| Sodium metasilicate | 5.0 |
| Calcium chloride | 2.0 |
| | 100.0 |

In order to demonstrate the specific action of the alkaline earth metal salts in reducing the swelling of hydratable clays in the presence of water and to indicate the degree to which this is accomplished, a number of experiments are carried out wherein samples of a bentonite clay ("Big Horn") were allowed to swell in aqueous solutions of various salts. In each experiment, a 1-gram sample of the air-dry clay was placed in a test tube and shaken vigorously with 15 ml. of a 1 per cent by weight aqueous solution of the salt. The mixture was then allowed to settle and the increase in volume of the clay was taken as the degree of swelling effected by the salt solution. The results of these experiments are tabulated as follows:

| 1 Per cent Salt Solution | Degree of Swelling, Percent |
|---|---|
| None (blank) | 11.0 |
| $CaCl_2$ | 2.9 |
| $MgCl_2$ | 3.1 |
| $BaCl_2$ | 3.7 |
| $SrCl_2$ | 3.3 |
| $MgSO_4$ | 4.7 |
| $CaSO_4$ | 5.5 |
| $NaCl$ | 8.0 |

It will be noted that in all cases the presence of as little as 1 per cent of the alkaline earth metal salt reduced the swelling of the clay by at least 50 per cent. In the case of calcium chloride, the swelling was reduced by almost 75 per cent. It will be noted further that sodium chloride, which has previously been included in oil-base drilling fluids for increasing the gel strength, is relatively ineffective in reducing the swelling of the clay.

In addition to having the property of inhibiting or reducing the swelling of hydratable clays in the presence of contaminating water, the drilling fluids of the invention have a further highly advantageous property in that any water with which the fluid may become contaminated readily separates upon standing. Heretofore, when oil-base drilling fluids become contaminated with water to an inadmissible extent they were usually discarded since separative of such water by chemical or physical means was prohibitively expensive. When the weighted drill-fluids of the present class became contaminated with water, such water dissolves the alkaline earth metal salt component of the fluid and emulsifies with the oil base so that the fluid becomes an emulsion of aqueous alkaline earth metal salt in oil. Such emulsion remains stable during drilling operations and upon standing for short periods of time, and, as previously explained, the alkaline earth metal salt serves to reduce the swelling action of the water on hydratable clays. Upon standing for relatively long periods of time, e. g., 8–10 days or more, however, the emulsion does not remain stable and the water settles out along with suspended solid materials.

Accordingly, should it become desirable at any time to remove the water with which a weighted drilling fluid of the present type may have become contaminated, this may be accomplished simply by allowing the fluid to stand undisturbed for a period of 8–10 days or more to permit the water to settle out, and thereafter drawing off the oil base.

As an illustration of the manner in which contaminating water may be removed from the weighted drilling fluids of the present class as described above, the drilling fluid described in Example I was artifically contaminated by the addition of about 15 per cent by weight of water. Upon standing undisturbed for 10 days, water and the weighting agent settled out of solution, whereupon the oil layer was drawn off for reuse. About 75 per cent of the oil originally present was recovered in this manner. The water content (ASTM method) of the reclaimed oil base was 2.2 per cent by weight. To provide a basis for comparison, a sample of the same drilling fluid from which the calcium chloride had been omitted was artificially contaminated by the addition of 15 per cent by weight of water, and was allowed to stand undisturbed for 10 days. In this case, the water content of the oil layer was 7.0 per cent by weight.

It will be apparent from the foregoing that the oil-base drilling fluids provided by the invention are particularly adapted for use under conditions of water contamination and where the formations traversed by the well bore contain hydratable clays. They may, of course, be satisfactorily employed where such conditions do not necessarily prevail. The weighted fluids have a further advantage in that contaminating water may readily be separated therefrom simply by allowing them to stand.

Other modes of applying the principle of my invention may be employed instead of those explained, change being made as regards the materials or methods employed provided the products stated by any of the following claims, or the equivalent of such stated products be obtained.

I, therefore, particularly point out and distinctly claim as my invention:

1. A substantially non-aqueous composition of matter adapted for use in drilling wells consisting essentially of a mineral oil base having dispersed therein between about 1 and about 10 per cent by weight of a solid water-soluble alkaline earth metal salt and between about 0.2 and about 10 per cent by weight of an oil-soluble metal soap dispersing agent capable of maintaining said alkaline earth metal salt uniformly dispersed in said mineral oil base.

2. A composition according to claim 1 wherein the dispersing agent comprises an oil-soluble metal soap of rosin acids.

3. A substantially non-aqueous composition of matter adapted for use in drilling wells consisting essentially of a mineral oil base having dispersed therein from about 1 to about 10 per cent by weight of solid calcium chloride and from about 0.2 to about 10 per cent by weight of a mixture of alkali-metal and calcium rosin acid soaps.

4. A substantialy non-aqueous composition of matter adapted for use in drilling wells consisting essentially of a mineral oil base having dispersed therein from about 1 to about 10 per cent by weight of a solid water-soluble alkaline earth metal salt, from about 0.2 to about 25 per cent by weight of an oil-soluble metal soap, and from about 2 to about 25 per cent by weight of a solid material adapted to increase the density of the composition.

5. A composition according to claim 3 in which the oil base consists of from about 60 to about 90 per cent of fuel oil and from about 10 to about 40 per cent by weight of diesel fuel.

PAUL W. FISCHER.

REFERENCES CITED

The following references are of record in the file of this patent:

UNITED STATES PATENTS

| Number | Name | Date |
| --- | --- | --- |
| 2,099,825 | Rolshausen | Nov. 23, 1937 |
| 2,316,967 | Miller | Apr. 20, 1943 |
| 2,350,154 | Dawson | May 30, 1944 |
| 2,430,039 | Anderson | Nov. 4, 1947 |
| 2,476,845 | Dawson | July 19, 1949 |
| 2,497,398 | Dawson | Feb. 14, 1950 |
| 2,542,019 | Fischer | Feb. 20, 1951 |